(Model.)
P. PATTERSON.
Apparatus for Operating the Mandrel Bars of Tube Welding Machines.
No. 235,801. Patented Dec. 21, 1880.
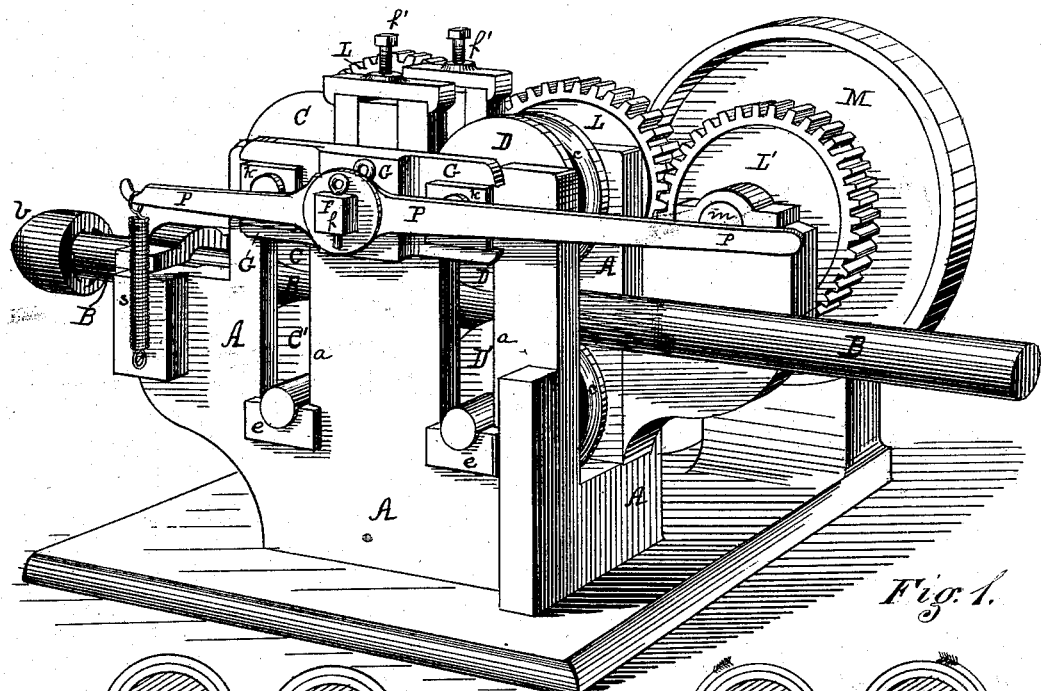
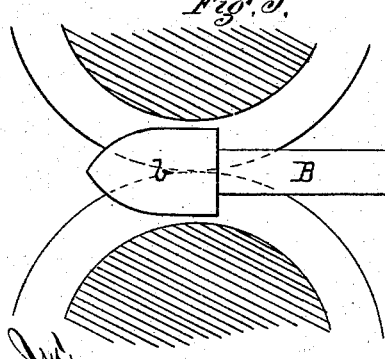
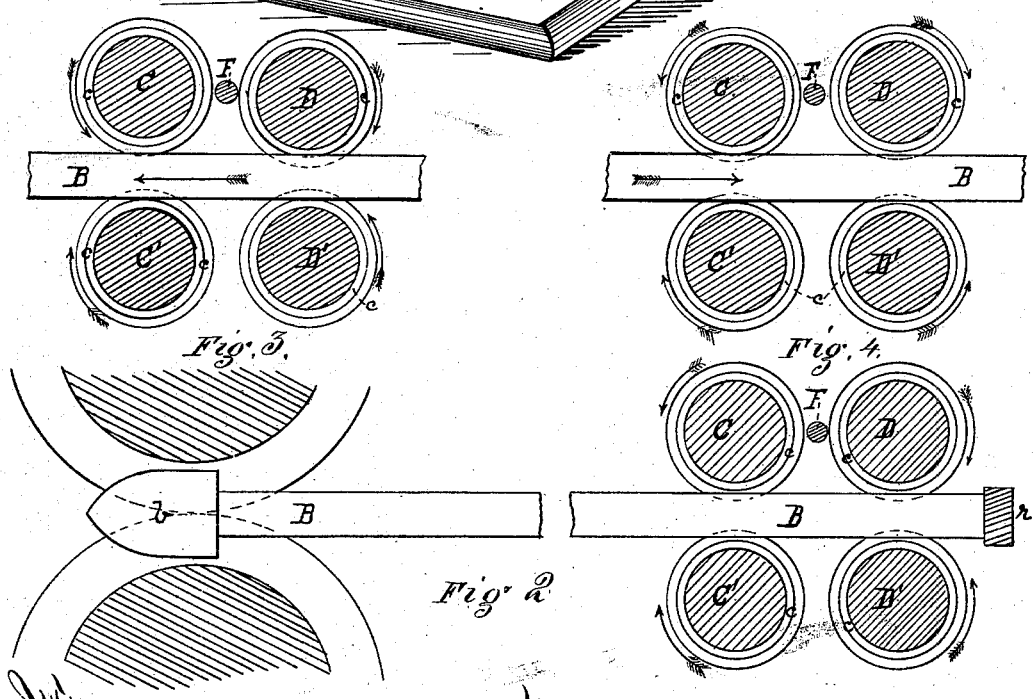
Witnesses:
J. R. Carbson
Clarence Burleigh
Inventor: Peter Patterson
By Attorney: James L. Kay

UNITED STATES PATENT OFFICE.

PETER PATTERSON, OF McKEESPORT, PENNSYLVANIA, ASSIGNOR TO NATIONAL TUBE WORKS COMPANY, OF SAME PLACE.

APPARATUS FOR OPERATING THE MANDREL-BARS OF TUBE-WELDING MACHINES.

SPECIFICATION forming part of Letters Patent No. 235,801, dated December 21, 1880.

Application filed September 9, 1880. (Model.)

*To all whom it may concern:*

Be it known that I, PETER PATTERSON, of McKeesport, in the county of Allegheny and State of Pennsylvania, have invented a new and useful Improvement in Apparatus for Operating the Mandrel-Bars of Tube-Welding Machines; and I do hereby declare the following to be a full, clear, and exact description thereof, reference being had to the accompanying drawings, forming a part of this specification, in which—

Figure 1 is a perspective view of my improved apparatus; and Figs. 2, 3, and 4 are diagram sectional views illustrating its operation.

Like letters indicate like parts in each.

My invention relates to the apparatus used to advance and draw back the bars which support the tube-welding mandrels or balls in the manufacture of lap-weld tubing. These bars are mounted back of the welding-rolls, and are longer than the length of tubing to be welded. They are so mounted as to support the ball or mandrel between the welding-rolls during the welding of the tubing, the tube resting around the bar after welding, after which the ball drops off the bar, and it is drawn back or retracted until the pipe is freed therefrom. This bar has generally been operated by hand, though different power-operated machinery has been adapted for the purpose. Difficulty has, however, been experienced in the use of apparatus operated by steam or other power, on account of the necessity of obtaining a reverse motion of the machinery, and the consequent jar and wear upon it.

The object of my invention is to provide improved apparatus for advancing or retracting the bar, by which all former objections to power-operated machinery for this purpose are fully overcome.

My improved apparatus consists in two sets of friction-rollers mounted in line, the upper or power rollers of each set being geared together so as to travel in opposite directions, and so supported by a rock-shaft that one roller will be drawn down to bite upon the mandrel-bar and the other raised clear thereof by the movement of the rock-shaft, by means of which apparatus the bar will be advanced or drawn back, according to whichever friction-roller is drawn down in contact with it.

To enable others skilled in the art to make and use my invention, I will describe its construction and operation.

In the drawings referred to, A represents the frame or housings of my improved apparatus. These housings are secured in any suitable manner in line with the welding-rolls, and the proper distance back from them, according to the length of the tubing to be welded.

B is the mandrel-bar, which supports the welding ball or mandrel *b* between the welding-rolls.

Mounted in the housings A are two sets of friction-rollers, C C′ and D D′, which are in line with the welding-rolls and each other. These friction-rollers are formed concave, so as to bite upon the mandrel-bar B, being either circular or angular, according to the shape of the bar, which extends through between the rollers and rests on the lower rollers, C′ D′. A groove, *c*, is formed in the center of the face of each roller to allow for wear. The lower rollers are mounted in stationary boxes *e* at the base of the housing-slots *a*, and have no power-connections, so that they do not revolve except when power is communicated to them from the friction of one of the upper rollers on the mandrel, as hereinafter described.

In the center of the upper part of the housings A is mounted the rock-shaft F, which extends through on either side of the frame or housings, and is provided with the yokes G, one on each side the housings, fitting on angular heads *f* of the rock-shaft on the outside of the housings. The yokes G extend out on each side of the shaft F and fit around and support the boxes *k*, which carry the upper rollers, C D, and are arranged to slide vertically in the housing-slots *a*. The upper friction-rollers, C D, are thus supported in the housings by means of the rock-shaft, yokes, and sliding boxes, and are provided with gear-wheels L, which mesh into each other, so that the rollers are driven in opposite directions. Power is applied to the upper rollers, C D, by means of a third gear-wheel, L′, operated by a band-wheel, M, both revolving on a shaft, *m*, mounted in bearings at one end of the apparatus, or by any other suitable power-connections. The upper rollers, C D, are supported in the housings A in such position that when on the same plane the space between the upper and lower rollers is large enough to permit the free movement of the mandrel-bar irrespective of the rollers. Upon the movement of the rock-shaft F one of the upper rollers is lowered in the rock-shaft yokes G, so as to bite upon the mandrel-bar and impart its motion thereto, while the other roller is raised in the opposite ends of the rock-shaft yokes, the upper rollers of the two sets of friction-rollers being thus thrown into and out of contact with the mandrel-bar by the movement of the rock-shaft.

The rock-shaft F is made vertically adjustable to suit different sizes of mandrel-bars by means of the housing-screws $f'$ or other suitable apparatus. The rock-shaft is operated by the hand-lever P, fitting over the angular end $f$ of the shaft. At the lower end of the lever P is the spiral or other spring $s$, connected to the housings A, which, by its pressure on the lever, serves to force the rock-shaft back to its normal position, where the rollers C D are on the same plane. At the rear of the apparatus is the usual transverse lever, $r$, Fig. 2, for locking the mandrel-bar during the welding of the tubing.

The operation of my improved apparatus is as follows: The lower rollers, C' D', remain idle when the apparatus is not in operation, and the upper rollers, C D, are rotated by the steam or other power connections, as above described, always traveling in opposite directions. The mandrel-bar B rests on the lower stationary rollers, C' D', when not in use. When it is desired to weld a length of tubing the usual ball or mandrel, $b$, is placed on the end of the bar, and motion is imparted to the rock-shaft F by the lever P until, by the movement of the yokes G, the friction-roller D is drawn down upon the bar, and, binding it between the two rollers D D', imparts the motion of the roller D thereto and forces the bar forward until the ball is brought to its place between the welding-rolls, and it is locked in that position by the transverse lever $r$, or other suitable mechanism. As soon as the lever P is freed the spring $s$ forces it back to its normal position and frees the rollers from the bar, so that during the welding operation the bar is held by mechanism separate from the puddling apparatus. The skelp previously heated is now welded into a tube in the usual manner of forming lap-weld tubing. After the welding of the tube the bar is freed from the locking mechanism and the bar is retracted or pulled out of the pipe, the welding-ball falling off the end when it is drawn against the end of the welded tube. In retracting the bar the friction-roller C is drawn down upon it by the movement of the rock-shaft, as above described, when the rollers C C', traveling in opposite directions from the rollers D D', will draw the bar out of the tube, which can then be removed and the operation continued, as above described. The mandrel-bar is thus advanced or drawn back, according to whichever friction-roller is held in contact therewith, by the movement of the hand-lever, thus bringing the apparatus fully within the control of the workman. As the upper or power rollers are never reversed, the jar consequent to the reversal of the power apparatus previously used is entirely done away with, and the wear of the apparatus is considerably lessened.

It is evident that other spring or lever mechanism for raising and lowering the upper friction-rollers can be adopted, and these I consider within my invention.

What I claim as my invention, and desire to secure by Letters Patent, is—

1. The herein-described apparatus for operating the mandrel-bars of tube-welding machines, consisting of two sets of friction-rollers mounted in line, the upper or power rollers being geared to revolve in opposite directions, and so supported in the housings that either power-roller may be drawn in contact with the mandrel-bar and impart its motion thereto, substantially as set forth.

2. In apparatus for operating the mandrel-bars of tube-welding machines, two sets of friction-rollers mounted in line, in combination with the rock-shaft F and yokes G, supporting the upper rollers in the housings, substantially as and for the purposes set forth.

3. In apparatus for operating the mandrel-bars of tube-welding machines, the two sets of friction-rollers mounted in line, in combination with the gear-wheels L and the rock-shaft F and yokes G, substantially as and for the purposes set forth.

4. In combination with two sets of friction-rollers mounted in line, the rock-shaft F, supporting-yokes G, lever P, and spring $s$, substantially as and for the purposes set forth.

In testimony whereof I, the said PETER PATTERSON, have hereunto set my hand.

PETER PATTERSON.

Witnesses:
  CLARENCE BURLEIGH,
  JAMES I. KAY.